United States Patent
Maurer

(10) Patent No.: US 6,186,734 B1
(45) Date of Patent: Feb. 13, 2001

(54) DETACHABLE TAIL DEVICE WITH LOCKING MECHANISM

(75) Inventor: Robert E. Maurer, Sutherland, IA (US)

(73) Assignee: Lakes Enterprises, Inc., Spencer, IA (US)

(*) Notice: Under 35 U.S.C. 154(b), the term of this patent shall be extended for 0 days.

(21) Appl. No.: 09/274,658

(22) Filed: Mar. 23, 1999

Related U.S. Application Data

(63) Continuation of application No. 09/274,658, filed on Mar. 26, 1999.

(51) Int. Cl.[7] .............................. B60P 1/43; B62D 53/06; B65G 67/02
(52) U.S. Cl. ............................. 414/537; 14/71.1; 296/61
(58) Field of Search .................................. 414/537, 538, 414/571, 481; 14/71.1; 296/61; 410/6

(56) References Cited

U.S. PATENT DOCUMENTS

| | | | |
|---|---|---|---|
| 2,871,027 | * | 1/1959 | Brockman ..................... 414/481 X |
| 3,796,333 | * | 3/1974 | Tebben ............................. 414/537 |
| 3,822,798 | * | 7/1974 | Neff .................................. 414/537 |
| 3,874,703 | * | 4/1975 | Ross et al. ..................... 414/481 X |
| 4,020,957 | * | 5/1977 | Wren ................................ 414/537 |
| 4,088,235 | * | 5/1978 | Thacker ........................... 414/537 |
| 4,144,979 | * | 3/1979 | Leach et al. .................... 414/537 |
| 4,400,005 | * | 8/1983 | Losh ............................. 414/481 X |
| 5,678,984 | * | 10/1997 | Petersen .......................... 414/537 |
| 5,769,593 | * | 6/1998 | Buffaloe ........................... 414/537 |
| 5,971,465 | * | 10/1999 | Ives et al. ..................... 414/537 X |

* cited by examiner

*Primary Examiner*—Robert P. Olszewski
*Assistant Examiner*—Gerald J. O'Connor
(74) *Attorney, Agent, or Firm*—Brian J. Laurenzo; Michael C. Gilchrist

(57) ABSTRACT

A detachable tail for a trailer which has a pair of female receiving sockets disposed in the trailer and also includes a pair of male extension members attached to the front thereof with pin receiving portions thereon for being received in the pair of female receiving sockets. Pins are operatively provided for being received in a pin receiving portion of the male extension members for holding the tail to the trailer. A rockshaft is provided for holding the pins and moving them in unison between a tail holding position to which these pins are biased and a non-holding position to allow the tail to be removed. A cam locking and moving mechanism is also provided for selectively moving the rockshaft and thereby the pins between the holding position and the non-holding position. Removable ramps are pivotally attached to the rear of the detachable tail and can be pivoted from a stored position on top of the movable tail to an operable position on a driving surface for allowing wheeled vehicles to be driven or winched thereover and onto the back of the trailer. These ramps also have an adjusting mechanism for allowing them to move toward each other or away from each other to adjust for the width between tires of vehicles.

34 Claims, 4 Drawing Sheets

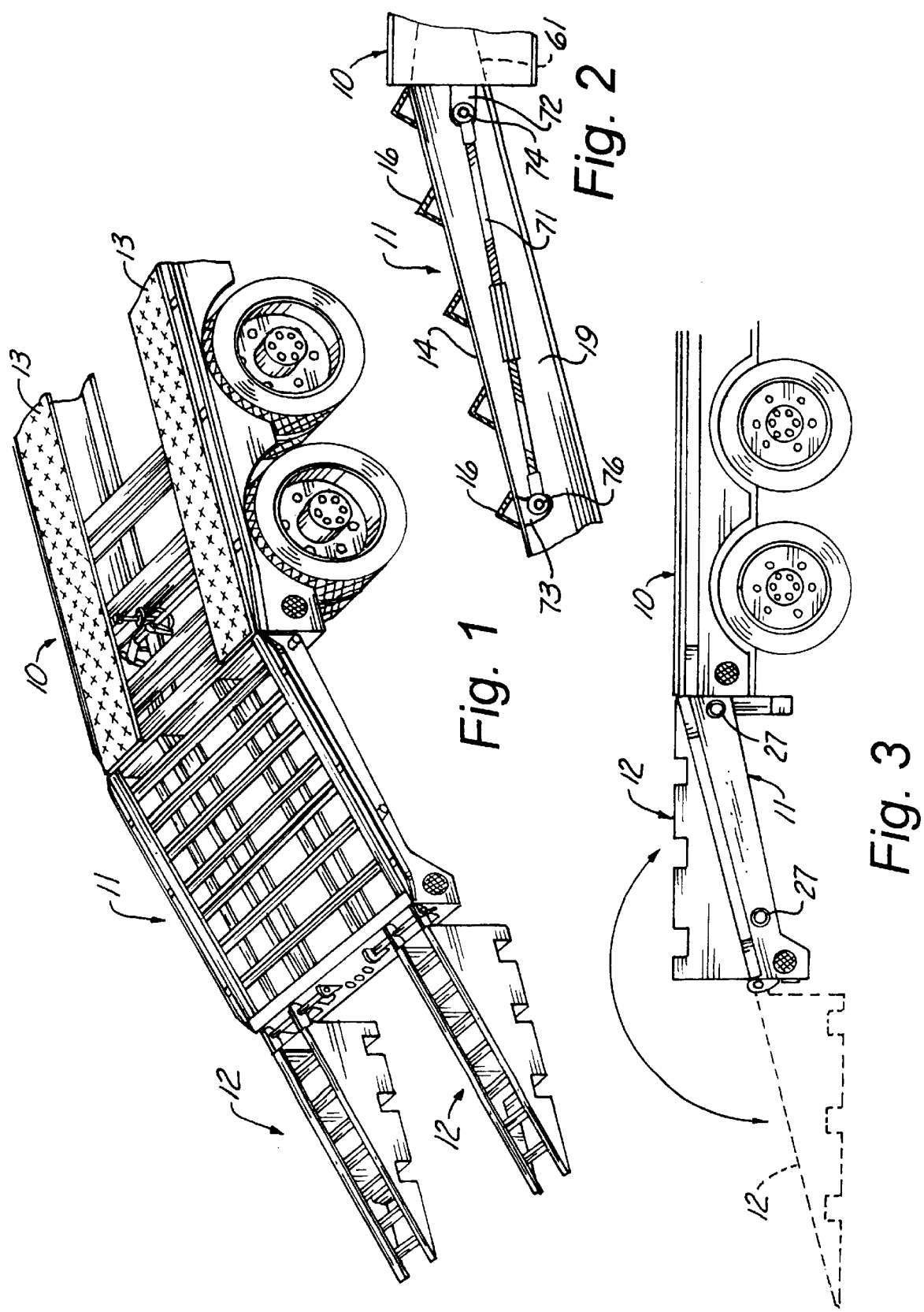

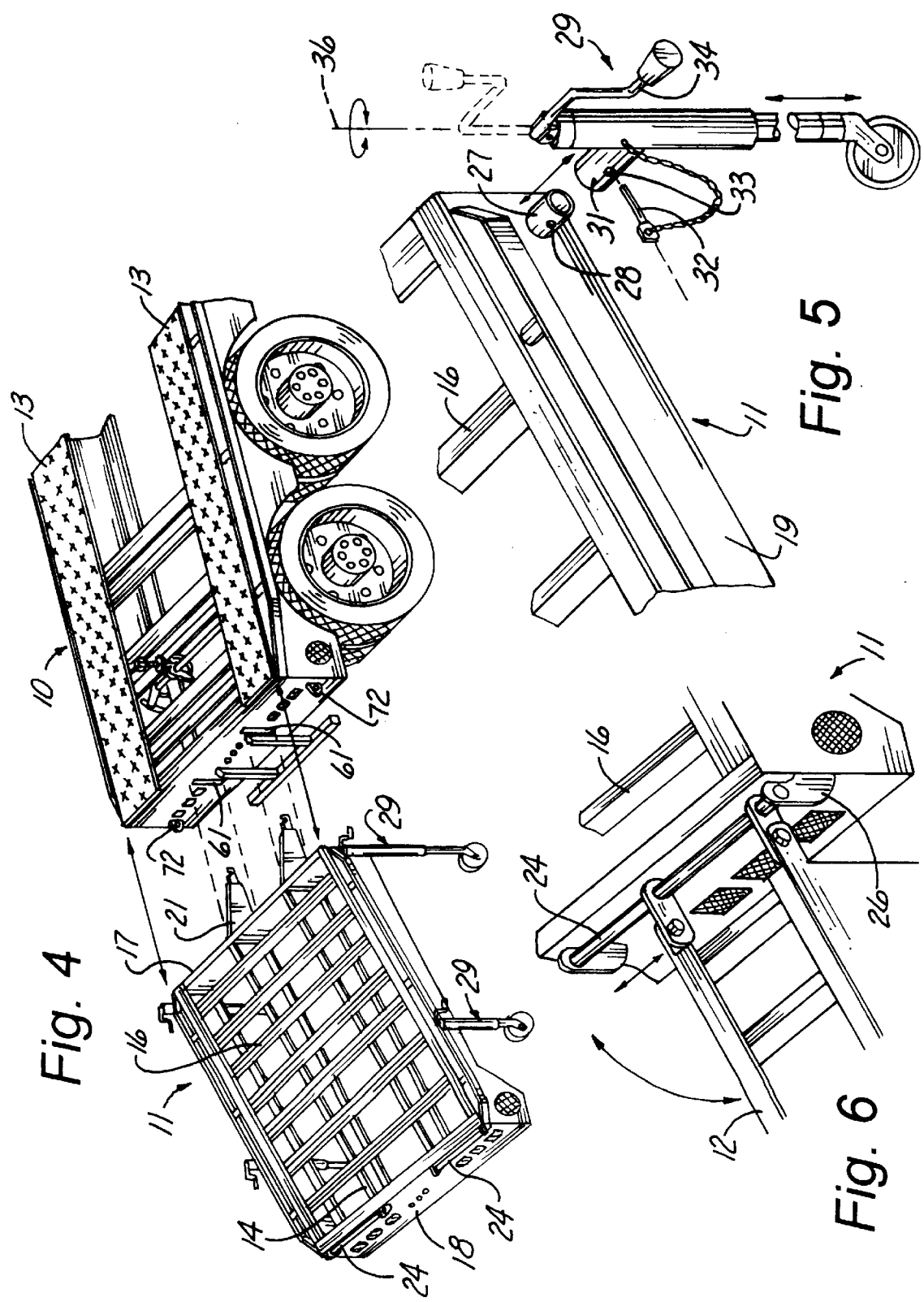

DETACHABLE TAIL DEVICE WITH LOCKING MECHANISM

CROSS-REFERENCE TO RELATED APPLICATIONS

Not Applicable

This is a continuation of pending application Ser. No. 09/274,658, filed Mar. 23, 1999.

STATEMENT REGARDING FEDERALLY SPONSORED RESEARCH OR DEVELOPMENT

Not Applicable

BACKGROUND OF THE INVENTION

1. Field of the Invention

This invention relates generally to a detachable tail for a trailer and more particularly to a detachable tail with an improved attaching and detaching mechanism.

2. Description of the Related Art

Standard flatbed trailers of the type pulled by semi-trailer trucks typically load from the side. A detachable tail has been known to be bolted to the back of such a flatbed trailer for allowing wheeled implements, motorized for mobile vehicles or things which can be pulled on and off to be loaded from the rear. This detachable tail essentially provides a ramp for loading and unloading. A major disadvantage of having a tail which is bolted to the rear of a standard flatbed trailer is that it can add 1,000 to 2,000 pounds to the pay load limits of what the trailer can haul, i.e. it reduces the amount that the trailer can haul because of the additional weight of the detachable tail itself. And for a tail which bolts on and off, it is extremely inconvenient to remove it when it is desired to haul a normal payload which does not need to be loaded from the rear.

A detachable tail does however allow for a dual purpose of having a ramp structure for loading wheeled vehicles or the like from the rear or, alternatively removing the detachable tail and having a standard flatbed trailer which can be loaded from the side without having weight disadvantages from having the detachable tail on it.

Accordingly, there exists a need for a detachable tail which is easier to attach and detach than what has been known in the prior art.

BRIEF SUMMARY OF THE INVENTION

The present invention relates to a trailer with a detachable tail having a top, a bottom, a front end and a rear end. A pair of female receiving sockets are disposed in the trailer and the detachable tail has a pair of male extension members attached to the front thereof with pin receiving portions thereon for being received in the pair of female receiving sockets. Pins are operatively disposed for being received in a pin receiving portion of the male extension members for holding the tail to the trailer.

Additionally, other aspects of the invention include a rockshaft for holding the pins and moving them in unison between a tail holding position to which these pins are biased and a non-holding position to allow the tail to be removed. A cam locking and moving mechanism is also provided for selectively moving the rockshaft and thereby the pins between the holding position and the non-holding position.

A still further aspect of the invention are removable ramps pivotally attached to the rear of the detachable tail which can be pivoted from a stored position on top of the movable tail to an operable position on a driving surface for allowing wheeled vehicles to be driven or winched thereover and onto the back of the trailer. These ramps also have an adjusting mechanism for allowing them to move toward each other or away from each other to adjust for the width between tires of vehicles which vary considerably between, for example, a passenger vehicle and an agricultural vehicle.

An object of the present invention is to provide an improved detachable tail for a trailer.

Another object of the present invention is to provide a detachable tail with a mechanism that allows it to be quickly and easily attached or detached from the trailer.

A still further object of the present invention is to provide a locking mechanism for quickly, easily and dependably attaching a detachable tail to a trailer.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a perspective view of a trailer of a type that is pulled by a semi trailer truck but having a detachable tail with pivoting ramps attached to the rear thereof;

FIG. 2 is a cross sectional view of a portion of the detachable tail taken in a vertical plane which is parallel to the forward direction of the trailer;

FIG. 3 is side elevational view of the detachable tail showing in solid lines the ramps tipped up to the mobile position thereof and shown in dashed lines in the loading position thereof, which are also shown in solid lines in FIG. 1;

FIG. 4 is an exploded view of the rear of a semi-trailer truck with the tail but without the ramps thereon and shown on jacks with caster wheels so that it can be moved easily to and from the trailer;

FIG. 5 is a partial perspective, exploded view of the detachable tail and one of the jacks which can be mounted onto the detachable tail to allow it to be easily moved around the shop between the storage position thereof and a position to be attached to the trailer;

FIG. 6 is an enlarged perspective partial view of the mechanism which allows the ramps to be pivoted between the position shown in FIG. 3 but also allows the ramps to be moved closer to each other or further apart to adjust for the distance between the wheels of the vehicle to be loaded onto the trailer;

DETAILED DESCRIPTION OF THE INVENTION

Figure 8:
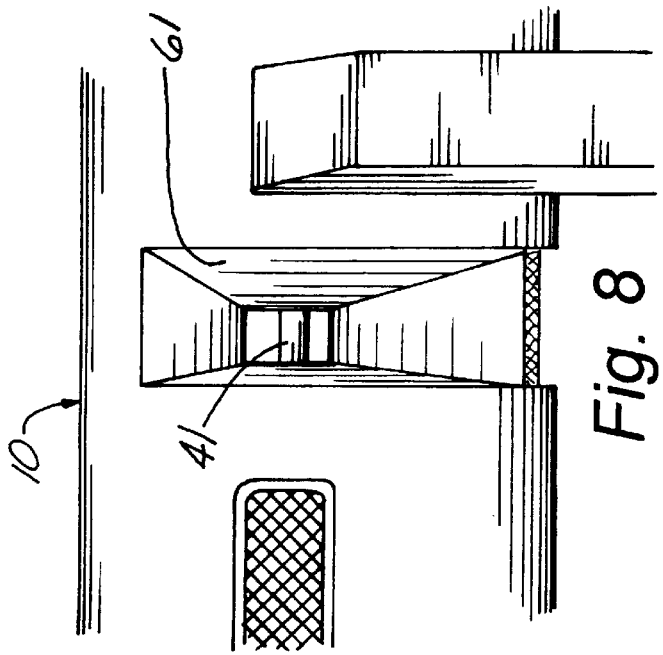
FIG. 8 is an enlarged partial rear view of one of the female receiving sockets in the rear of the trailer itself for receiving the male extension member of FIG. 7.

Referring now to the drawings, wherein like reference numerals designate identical or corresponding parts throughout the several views, FIG. I shows a trailer (10) having a detachable tail (11) located behind the rearward ground engaging wheel assembly attached thereto and the detachable tail (11) having ramps (12) pivotally attached to the rear thereof and movable between the loading position shown in FIG. 1 and the storage position shown in solid lines in FIG. 3. The trailer (10) has a bed comprised of treadways (13) thereon for receiving the wheels of vehicles.

The detachable tail (11) is welded together with a series of longitudinal frame members (14) and cross members (16). It has a front portion (17) and a rear portion (18) as well as side portions (19). Male extension members (21) have a portion (22) thereon with a slot (23) therein which will be discussed below. A rod (24) is welded by brackets (26) to each side of the rear of the tail (11) for pivotally receiving ramps (12) as can be seen in FIGS. 1, 3 and 6. This allows the ramps to be pivoted from the position shown in solid lines in FIG. 1 to the position shown in solids lines in FIG. 3.

Also, cylindrical extenders (27) having pin openings (28) therein are welded to the side members (19) of the detachable tail (11) for allowing jacks (29) to be attached thereto by sliding portion (31) onto cylindrical portion (27) and inserting a pin (32) through openings (28) and (33). This allows the handle (34) of the jack to be moved to the dashed line position and then pivoted about an axis (36) to selectively move the tail up or down and hold it in a desired position, for example in the position shown in FIG. 4. This allows the tail (11) to be rolled around the shop floor and stored wherever it is to be stored and then easily moved to the position shown in FIGS. 4 and 10 whereby it can be easily attached to the rear of the trailer (10) behind the ground engaging wheel assembly.

Figure 9:
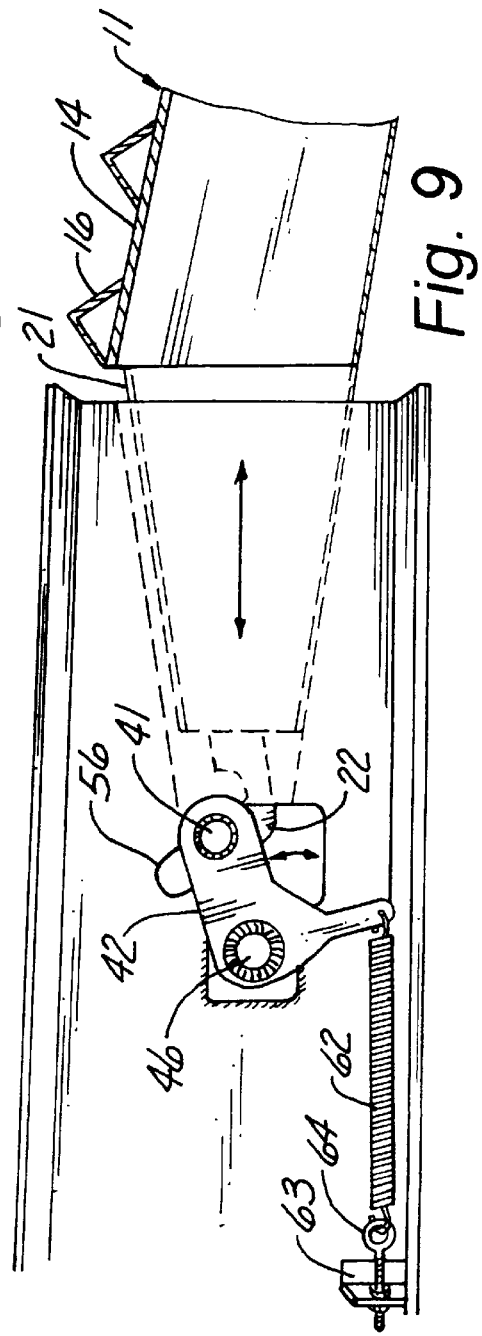
FIG. 9 is an enlarged side view on the outside between the frame of the trailer and the tires of the trailer which show a bracket biased to a locked position by a biasing spring and having pins thereon and showing how the male extension member can be moved toward, away from and into the female receiving sockets in order to be selectively held to the trailer or for allowing it to be removed from the trailer.
Figure 11:
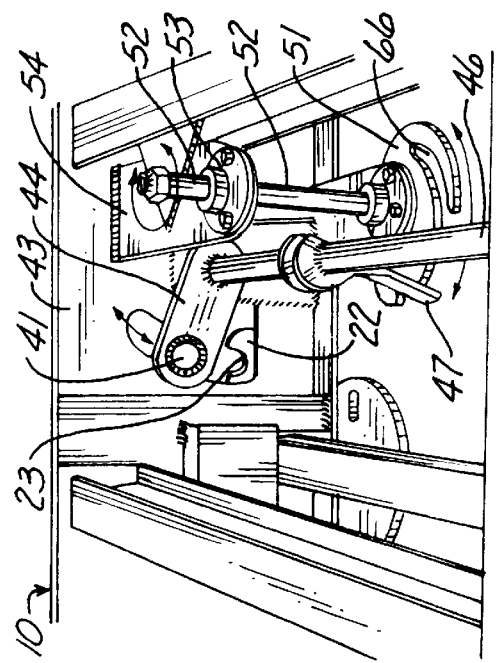
FIG. 11 is a perspective view of a rockshaft which allows the pin to move from a position in a notch of the male extension member to which it is a biased by a cam mechanism which rotates about a vertical axis.
Figure 12:
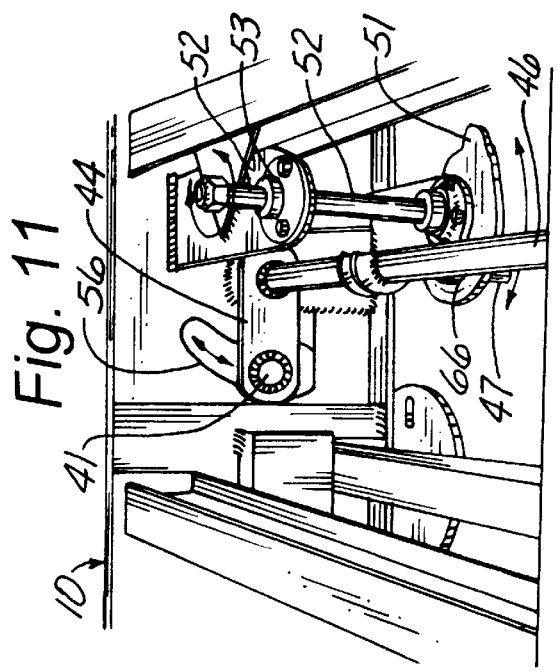
FIG. 12 shows the pins and rockshaft being moved by the cam and held by the cam to a tail holding position, as contrasted with the non-holding position of FIG. 11.

Referring now to FIGS. 8–12, it is noted that pins (41) are disposed between and welded to brackets (42) shown in FIG. 9 on the outside of the frame member (43) and bracket (44). The brackets (42) and (44) are in a pair attached to each end of a rockshaft (46) which is pivotally mounted to the frame members (43). The rockshaft (43) has an extension member (47) thereon and which is welded to the rockshaft (46) and rotates with the rockshaft (46) and since the brackets (44) and (42) are also welded to the rockshaft (46), they all move in unison. A cam mechanism (51) is rotatably mounted about a vertical axis of the pin (52), which is mounted in a bearing (53) to a bracket (54) welded to the frame (43). The cam (51) is movable between the position shown in FIG. 11 wherein it has moved the arm (47) and thereby the brackets (42) and (44) and pins (41) to a position raised above the notch (23) of portion (22) of the male extension member (21). This can be seen through an opening (56) in frame member (43) as shown in FIGS. 11 and 12.

Figure 7:
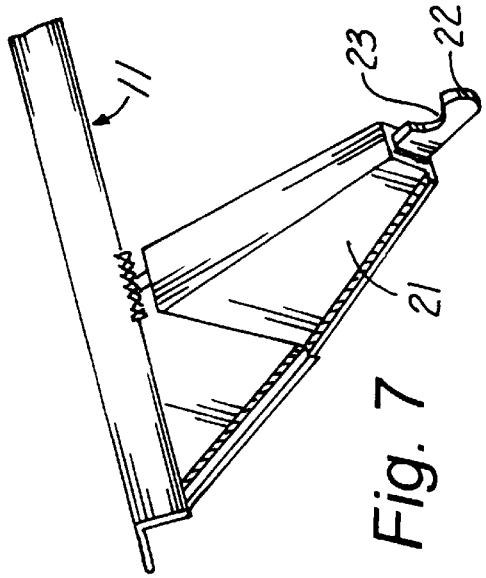
FIG. 7 is a perspective view of the one of the male extension members attached to the front of the detachable tail.
Figure 10:
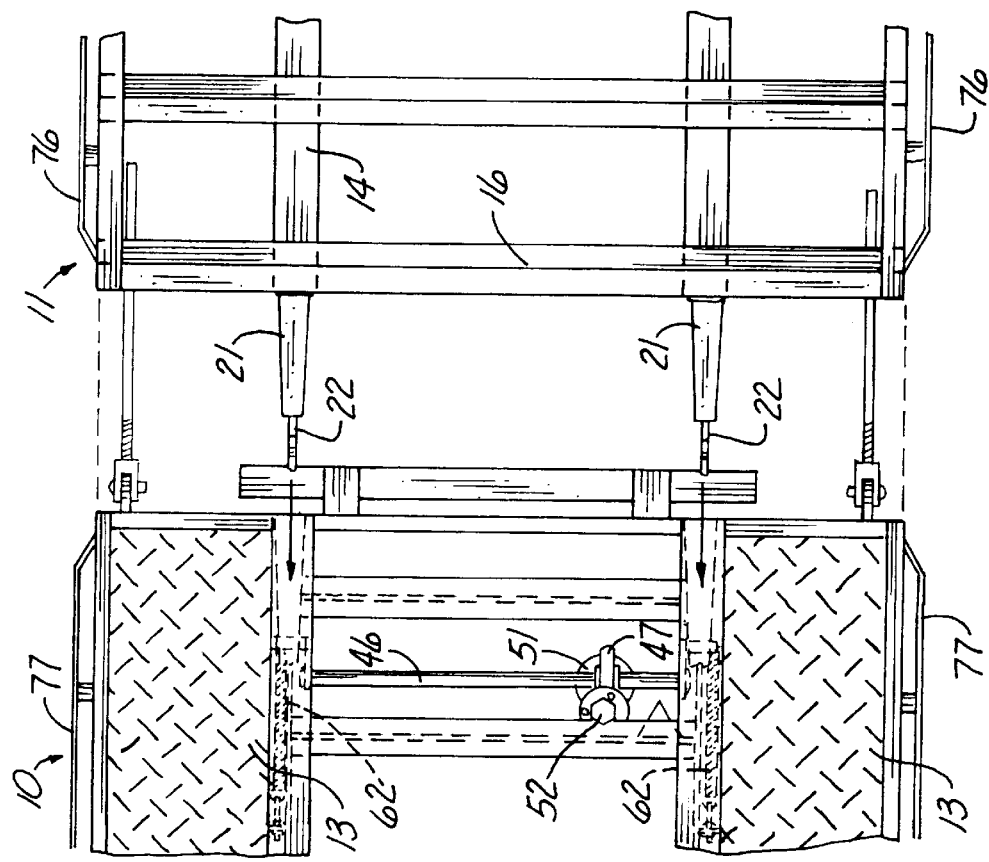
FIG. 10 is a top view similar to FIG. 4 and showing how the detachable tail can be moved into and locked onto the trailer or removed from the trailer, the arrows indicating that the detachable tail is being moved into an operatively attached position thereof.

In operation, the tail (11) which would be on the jacks (29), would be rolled to the position shown in FIG. 4 and then on to the position shown in FIG. 10 whereby the male extension members (21) move into the female receiving sockets (61), as best shown in FIGS. 9 and 10. As the male extension members (21) move into the female receiving slots (61), they are automatically aligned because the tapering walls of the female portion (61) and the tapering trapezoidal shaped walls of the male extension member (21) as viewed in FIGS. 7 and 10.

Once the male extension member (21) is fully inserted into the female receiving socket (61), for example, to the position shown in FIG. 11, the pin (41) will be directly above the slot (23) in male extension member portion (22). At that time, the rod (52) is rotated by using a wrench on the top thereof. For example, to rotate the cam (51) in a clockwise direction as shown from the top thereof to the position shown in FIG. 12 wherein the rockshaft will be rotated in a counter-clockwise position as shown in FIG. 12 and the bracket (44) will move downwardly and the pin (41) will be received in the slot (23) of male extension member (21) in the portion (22) thereof due to the force of spring (62) pulling the pins (41) into slots (23). Because the member (47) has been moved by the cam (51), the member (47) is also locked in the slot (66) so that it cannot move in either direction. Consequently, the pins (41) are in a tail holding position in FIG. 12 and furthermore, the pins cannot move out of this position to which they are spring-biased by a spring (62) attached at one end to the bracket (42) and to the other end to the frame (43) by a bracket (63) and eyelet (64). Not only is the spring biasing the pins (41) downwardly into the shaft, but the cam structure (51) is holding the member (47), which holds the rockshaft (46), from pivoting. This also keeps the brackets (44) which hold the pin (41) from moving.

When the parts are in the position shown in FIG. 12, the detachable tail can be used as shown in FIGS. 1 and 3 to load wheeled vehicles or the like and haul them from place to place.

When it is desired to remove the detachable tail (11) from the position shown in FIG. 1 to the position shown in FIG. 4, the mechanism shown in FIG. 12 is utilized by rotating the shaft (52) to the position shown in FIG. 11 wherein the cam (51) will push the arm (47) to the position shown in FIG. 11, whereby it will pivot the rockshaft (46) and thereby the brackets (44) and pins (41) upwardly against the bias of the spring (62) so that the pins (41) are no longer in the slots (23) of extension (22) of male extension member (21). This will allow the detachable tail to be removed as shown in FIG. 4 with the jacks (29) attached thereto and stored wherever desired.

A secondary safety lock structure can also be used, as shown in FIG. 2. This includes a turnbuckle (71) which is pivotally attached to a bracket (72) on the rear of the trailer (10) and is also pivotally attached to a bracket (73) welded to the underside of the longitudinal member (14) of the detachable tail (11). Preferably two of these adjustable tumbuckles (71) are used and it can be seen in FIG. 4 that a pair of brackets (72) are attached to the rear of the trailer (10) for this purpose and it will further be understood that another bracket (73), which is not shown, will be welded to the detachable tail (11). A ratchet binder (not shown) can replace the turnbuckles (71) if desired. Pins (74) are utilized to pivot the turnbuckle (71) to the bracket (72) and a similar pin (76) is used to pivotally attach the turnbuckle (71) to the bracket (73) on the detachable tail (11). Side rails (76) are optionally welded to the side of the detachable tail (11) to match side rails (77) on the side of the trailer (11).

Obviously many modifications and variations of the present invention are possible in light of the above teachings. It is therefore to be understood that, within the scope of the appended claims, the invention may be practiced otherwise than as specifically described.

I claim:

1. Apparatus comprising:
   a trailer with a front and a rear having a ground engaging wheel assembly operably attached adjacent to the rear thereof;
   a detachable tail located behind said rearward ground engaging wheel assembly of said trailer, having a top, a bottom, a front end and a rear end;
   a pair of female receiving, sockets attached to said trailer behind said wheel assembly;
   a pair of male extension members attached to the front end of said tail, each having a pin receiving portion thereon, said male extension members having an operative position disposed into said female receiving sockets and a storage position removed from said female receiving sockets; and
   a pin, operatively disposed in each of said pin receiving portion when the male extension members are in the operative position thereof, said pins being removable for allowing the detachable tail to be removed from the trailer.

2. The apparatus of claim 1 including said pins being pivotally disposed about a rockshaft for movement between a tail holding position in said pin receiving portion and a non-holding position.

3. The apparatus of claim 2 including means for biasing said pins into the holding position thereof.

4. The apparatus of claim 3 including means associated with said rockshaft for selectively moving said pins to the non-holding position.

5. The apparatus of claim 4 including means for selectively locking said pins into the tail holding position.

6. The apparatus of claim 4 including means for selectively locking said pins in the non-holding position.

7. The apparatus of claim 6 wherein said locking means comprises an arm attached to the rockshaft and a cam member operatively attached to said trailer for moving and holding the arm and therefor the rockshaft and pins selectively in the holding or non-holding positions thereof.

8. The apparatus of claim 1 wherein said female receiving sockets are tapered to help align the male extension members as they are inserted into the female receiving sockets.

9. The apparatus of claim 8 wherein said male extension members are tapered to help align the male extension members with the female receiving slots and the male extension members are pushed into the female sockets.

10. The apparatus of claim 9 wherein the sides, top and bottom of both the male extension members and the female receiving slots are trapezoidal in shape.

11. The apparatus of claim 10 including a secondary safety member selectively operatively attached to the rear of the trailer and to the bottom of the detachable tail for exerting a tension force on the secondary safety member.

12. The apparatus of claim 1 including means for attaching jacks with rollers on the bottom thereof to said detachable tail for allowing it to be easily moved on a floor when it is detached.

13. The apparatus of claim 1 including ramp members pivotally attached to the rear of the detachable tail.

14. The apparatus of claim 13 including means for allowing said ramps to be adjusted toward or away from each other while attached to said detachable tail.

15. The apparatus of claim 1 wherein said ground engaging wheel assembly is closer to the rear than to the front of said trailer.

16. The apparatus of claim 15 wherein said location of said detachable tail is located behind said ground engaging wheel assembly that is closer to the rear than the front of said trailer.

17. The apparatus of claim 1 wherein the top of the tail is higher at the front end than at the rear end thereof.

18. Apparatus comprising:
   a bed for hauling freight with a front and a rear and having a ground engaging wheel assembly operably attached adjacent to the rear thereof;
   a detachable tail located behind said rearward ground engaging wheel assembly of said bed, having a top, a bottom, a front end and a rear end;
   a pair of female receiving, sockets attached to said bed behind said wheel assembly;
   a pair of male extension members attached to the front of said tail, each having a pin receiving portion thereon, said male extension members having an operative position disposed into said female receiving sockets and a storage position removed from said female receiving sockets; and
   a pin, operatively disposed in each of said pin receiving portion when the male extension members are in the operative position thereof, said pins being removable for allowing the detachable tail to be removed from the bed.

19. The apparatus of claim 18 including said pins being pivotally disposed about a rockshaft for movement between a tail holding position in said pin receiving portion and a non-holding position.

20. The apparatus of claim 19 including means for biasing said pins into the holding position thereof.

21. The apparatus of claim 20 including means associated with said rockshaft for selectively moving said pins to the non-holding position.

22. The apparatus of claim 21 including means for selectively locking said pins into the tail holding position.

23. The apparatus of claim 21 including means for selectively locking said pins in the non-holding position.

24. The apparatus of claim 23 wherein said locking means comprises an arm attached to the rockshaft and a cam member operatively attached to said bed for moving and holding the arm and therefor the rockshaft and pins selectively in the holding or non-holding positions thereof.

25. The apparatus of claim 18 wherein said female receiving sockets are tapered to help align the male extension members as they are inserted into the female receiving sockets.

26. The apparatus of claim 23 wherein said male extension members are tapered to help align the male extension members with the female receiving slots and the male extension members are pushed into the female sockets.

27. The apparatus of claim 26 wherein the sides, top and bottom of both the male extension members and the female receiving slots are trapezoidal in shape.

28. The apparatus of claim 27 including a secondary safety member selectively operatively attached to the rear of the bed and to the bottom of the detachable tail for exerting a tension force on the secondary safety member.

29. The apparatus of claim 18 including means for attaching jacks with rollers on the bottom thereof to said detachable tail for allowing it to be easily moved on a floor when it is detached.

30. The apparatus of claim 18 including ramp members pivotally attached to the rear of the detachable tail.

31. The apparatus of claim 30 including means for allowing said ramps to be adjusted toward or away from each other while attached to said detachable tail.

32. The apparatus of claim 18 wherein said ground engaging wheel assembly is closer to the rear than to the front of the sand bed.

33. The apparatus of claim 32 wherein said location of said detachable tail is located behind said ground engaging wheel assembly that is closer to the rear than the front of said bed.

34. The apparatus of claim 18 wherein the top of the tail is higher at the front end than at the rear end thereof.

* * * * *